(12) United States Patent
Sanfilippo et al.

(10) Patent No.: US 8,753,745 B2
(45) Date of Patent: Jun. 17, 2014

(54) HIGH BARRIER FILM

(75) Inventors: James J. Sanfilippo, Barrington, IL (US); Jeanne M. Skaggs, Arlington Heights, IL (US); Paul Georgelos, Naperville, IL (US)

(73) Assignee: Clear Lam Packaging, Inc., Elk Grove Village, IL (US)

( * ) Notice: Subject to any disclaimer, the term of this patent is extended or adjusted under 35 U.S.C. 154(b) by 288 days.

(21) Appl. No.: 12/987,014

(22) Filed: Jan. 7, 2011

(65) Prior Publication Data

US 2011/0171461 A1 Jul. 14, 2011

Related U.S. Application Data

(60) Provisional application No. 61/293,478, filed on Jan. 8, 2010.

(51) Int. Cl.
| | | |
|---|---|---|
| *B32B 17/10* | (2006.01) | |
| *B32B 9/04* | (2006.01) | |
| *B32B 27/30* | (2006.01) | |
| *B32B 23/04* | (2006.01) | |
| *B29C 65/00* | (2006.01) | |
| *G11B 11/105* | (2006.01) | |

(52) U.S. Cl.
USPC ........ 428/411.1; 428/332; 428/339; 428/522; 428/532; 156/60

(58) Field of Classification Search
None
See application file for complete search history.

(56) References Cited

U.S. PATENT DOCUMENTS

| | | | |
|---|---|---|---|
| 2006/0110615 A1* | 5/2006 | Karim et al. ................. | 428/500 |
| 2008/0160327 A1* | 7/2008 | Knoerzer et al. ............ | 428/457 |

FOREIGN PATENT DOCUMENTS

WO 2008021811 A1 2/2008

* cited by examiner

*Primary Examiner* — Sheeba Ahmed
(74) *Attorney, Agent, or Firm* — Cardinal Law Group LLC

(57) ABSTRACT

A high barrier film and method of forming a high barrier film. The film includes a biopolymer and metallization layers. A primer layer is applied to one of the metallization layer and the biopolymer layer and a nanocomposite barrier coating is disposed between the primer layer and the metallization layer. The film includes a second biopolymer layer and an adhesive layer, the adhesive layer disposed between the second biopolymer layer and the metallization layer, where the second biopolymer layer is adhered to at least one of the biopolymer layer, the metallization layer, the primer layer and the nanocomposite layer.

18 Claims, 6 Drawing Sheets

HIGH BARRIER FILM

CLAIM FOR PRIORITY

This application claims priority from U.S. Provisional Application Ser. No. 61/293,478 filed Jan. 8, 2010, the complete subject matter of which is incorporated herein by reference in its entirety.

FIELD OF THE INVENTION

The invention relates to films. More particularly, embodiments relate to high barrier films.

BACKGROUND OF THE INVENTION

Multi-layered films are useful in forming hermetic seals, protecting packaged food products from loss of flavor, staleness, or spoilage due to light, oxygen and moisture. In addition, multi-layered films prevent undesirable leaching of the product to the outside of the film. For example, oily food products have the potential for some oil to leach out of the package.

Films formed of biopolymer layers generally are not effective as a barrier against oxygen or moisture. That is, such barriers allow oxygen and moisture to pass (i.e., allow diffusion). One approach to solving this problem has been to apply a metallization layer to the biopolymer layer. However, such biopolymer/metallization combinations do not improve the barrier qualities to sufficient levels. Such combination layers act as a partial barrier to oxygen and moisture but still allow some moisture and oxygen vapors to pass.

For the foregoing reasons, it is desirable to have a high barrier film that solves the above problems.

SUMMARY OF THE INVENTION

One embodiment relates to a high barrier film. The film includes a first biopolymer and metallization layers. A primer layer is applied to one of the metallization layer and the first biopolymer layer and a nanocomposite barrier coating is disposed between the primer layer and the metallization layer. The film includes a second biopolymer layer and an adhesive layer, the adhesive layer disposed between the second biopolymer layer and the metallization layer, where the second biopolymer layer is adhered to at least one of the biopolymer layer, the metallization layer, the primer layer and the nanocomposite layer.

Yet another embodiment relates to a package including a high barrier film. In this embodiment, the film includes a product side biopolymer layer and metallization layer. A barrier enhancement layer is disposed between the metallization layer and the product side biopolymer layer. The film includes an outer biopolymer layer and an adhesive layer, the outer biopolymer layer laminated to at least one of the product side biopolymer layer, the metallization layer and the barrier enhancement layer.

Another embodiment relates to a method of forming a high barrier film. This method includes providing a first biopolymer layer and applying a primer layer to the first biopolymer layer. A nanocomposite barrier coating is applied to at least one of the first biopolymer layer and the primer layer and a metallization layer is applied to at least one of the first biopolymer layer, the primer layer and the nanocomposite barrier coating. A second biopolymer layer is laminated to at least one of the first biopolymer layer, the primer layer, the nanocomposite barrier coating and the metallization layer.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF PRESENTLY PREFERRED EMBODIMENTS

Figure 1:
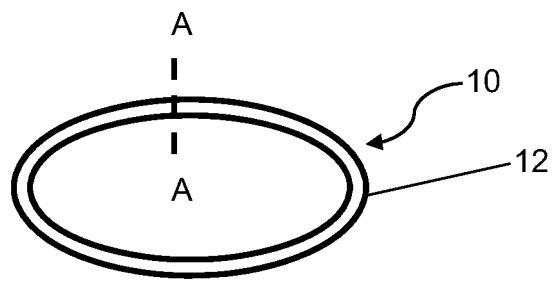
FIG. 1 is a cross section view of a package including a high barrier film in accordance with the present invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

In describing the presently preferred embodiments and methods according to the invention, a number of terms will be used, the definitions or scope of which will now be described.

As defined herein, the term "bond strength" refers to the grams of force required to peel one inch wide strips of laminate as described in the 180 degree peel test applied to a one inch strip of laminate and is expressed as either grams, grams of force or grams per inch of pull as described in the associated ASTM test method Number F904-98.

As defined herein, the term "clear" refers to film or laminate without bubbles and is measured in Haze units as described in the associated ASTM Haze and Luminous test Number D1003-61.

As defined herein, the term "multilayered film", "multilayered films" "multilayered structure" or "one or more layers" refers to a plurality of layers in a single film or substrate structure generally in the form of a sheet or web which may be made from a polymer material, a non-polymer material, a bio-polymer material, some combination thereof or the like for example, bonded together by any conventional means known in the art (co-extrusion, extrusion coating, lamination, solvent coating, emulsion coating, suspension coating, adhesive bonding, pressure bonding, heat sealing, thermal lamination, ultrasonic welding, some combination thereof or the like for example).

As defined herein, the term "laminate" and the phrase "film laminate", when used as a noun, refers to the resulting product made by bonding together two or more substrates, layers or other materials. "Laminate", "Lamination", "laminated" and "thermally laminated" when used as a verb, means to affix, bond, join, connect or adhere (by means of extrusion, co-extrusion, extrusion coating, lamination, solvent coating, emulsion coating, suspension coating, adhesive bonding, pressure bonding, heat sealing, thermal lamination, ultrasonic welding, some combination thereof or the like for example of two or more layers so as to form a multilayered film or structure.

As defined herein, the term "polymer" refers to the product of a polymerization reaction, and is inclusive of homopolymers, copolymers, terpolymers, or the like for example, the layers of a film or film substrate can consist essentially of a single polymer, or can have still additional polymers together therewith, i.e., blended therewith.

As defined herein, the term "copolymer" refers to polymers formed by the polymerization of at least two different monomers. For example, the term "copolymer" includes the co-polymerization reaction product of ethylene and an .alpha.-olefin, such as 1-hexene. The term "copolymer" is also inclusive of, for example, the co-polymerization of a mixture of ethylene, propylene, 1-propene, 1-butene, 1-hexene, and 1-octene. As defined herein, a copolymer identified in terms of a plurality of monomers, e.g., "propylene/ethylene copolymer", refers to a copolymer in which either a monomer may co-polymerize in a higher weight or molar percent than the other monomer or monomers. However, the first listed monomer preferably polymerizes in a higher weight percent than the second listed monomer.

As defined herein, the term "PUDs" refers to Waterborne Polyurethane Dispersions low in Volatile Organic Compounds (VOC) content or do not contain any VOC at all. Formulations based on polyurethane dispersions technology allow for compliance with environmental regulations that are increasingly stringent in many countries and regions As defined herein, the term "coextruded" refers to a material formed by the process of extruding two or more polymeric materials through a single die with two or more orifices arranged so that the extrudates merge and weld together into a laminar structure before chilling and solidifying. The film substrates described herein may be generally prepared from dry resins which are melted in an extruder and passed through a die to form the primary film material, most commonly in tube or sheet form. In the coextruded films described herein, all layers were simultaneously coextruded, cooled via water, chilled metal roll, or air quenching. Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the film, by blending prior to extrusion. The resins and any additives are introduced to an extruder where the resins are melt plasticized by heating and then transferred to an extrusion (or co-extrusion) die for formation into a tube or any other form using any suitable extrusion method. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

As defined herein, the term "polyolefin" refers to homopolymers, copolymers, including having a methylene linkage between monomer units which may be formed by any method known to those skilled in the art. Examples of polyolefins include polyethylene (PE), low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), high-density polyethylene (UHDPE), ethylene/propylene copolymers, polypropylene (PP), propylene/ethylene copolymer, polyisoprene, polybutylene, polybutene, poly-3-methylbutene-1, poly-4-methylpentene-1, ionomers, polyethylenes comprising ethylene/.alpha.-olefin which are copolymers of ethylene with one or more .alpha.-olefins (alpha-olefins) such as butene-1, hexene-1, octene-1, or the like as a comonomer, and the like.

As defined herein, the term "ionomer" refers to metal-salt, e.g., sodium, zinc, neutralized ethylene acrylic or methacrylic acid copolymers.

As defined herein, the term "polyester" refers to homopolymers or copolymers having an ester linkage between monomer units which may be formed, for example, by condensation polymerization reactions between a dicarboxylic acid and a glycol. The ester monomer unit can be represented by the general formula: [RCO.sub.2R'] where R and R'=alkyl group. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. An example of preferred polyester is polyethylene terephthalate copolymer.

As defined herein, the term "nylon" refers to polyamide homopolymers, copolymers, or terpolymers having an amide linkage between monomer units which may be formed by any method known to those skilled in the art. The nylon monomer can be presented by the general formula: [CONH] or [CONR] where R=alkyl group. Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9

(polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other nylons which are not particularly delineated here.

As defined herein, the terms "heat-seal", "heat-sealing", "heat-sealable", and the like refer to a first portion of a film surface (i.e., formed from a single layer or multiple layers) capable of forming a fusion bond to a second portion of a film surface. A heat-seal layer is capable of fusion bonding by conventional indirect heating means which generate sufficient heat on at least one film contact surface for conduction to the contiguous film contact surface and formation of a bond interface there between without loss of the film integrity. Heat-sealing can be performed by any one or more of a wide variety of manners, such as using a heat-seal technique (e.g., melt-bead sealing, thermal sealing, impulse sealing, ultrasonic welding, hot air, hot wire, infrared radiation, and the like).

As defined herein, the phrase "surface layer" as applied to film layers of the present invention refers to any layer that is capable of having at least a portion of one of its principal surfaces directly adhered to another layer of the film laminate.

As defined herein, the terms "join", "joins" and "adheres" are used in their broad sense to mean two formerly separate portions of a single laminate or one or two layers of a substrate which are connected together either by folding the laminate or layer onto itself thereby defining an edge or by bonding at least a portion of two layers together with an adhesive or by other means known to those skilled in the art.

As defined herein, the term "adhesive" refers to a flexible adhesive formed of a solvent or water based, polyurethane or polyester/polyether materials or the like, including dry bond, wet bond, gravure, reverse gravure, mayer rod, rollcast, serving a primary purpose or function of adhering two surfaces to one another. In the present invention, the adhesive may adhere one layer to another layer. Adhesives can be applied through direct gravure or reverse gravure coating. Reverse gravure provides a much clearer adhesive layer, however, very good results were attained using standard direct gravure coating as well. Exemplary adhesives include the LA1150-52 adhesive available from the Henkel Corporation of Cary, N.C., the L49x159 solvent based polyurethane adhesives or the Mor-Free 75-164 solventless polyurethane adhesives available from the Dow Chemical Company of Philadelphia, Pa.

As defined herein, the term "rigid" refers to a material capable of holding or retaining its original shape of form or returning to its original shape or form under return to initial conditions and is substantially firm in final form.

As defined herein the term "biodegradable" refers to material which, when exposed to an aerobic and/or anaerobic environment, ultimately results in the reduction to monomeric components due to microbial, hydrolytic, and/or chemical actions. Under aerobic conditions, biodegradation leads to the transformation of the material to end products such as carbon dioxide and water. Under anaerobic conditions, biodegradation leads to the transformation of the materials to carbon dioxide, water, and methane. The biodegradability process is often described as mineralization. Biodegradability means that all organic constituents of the films are subject to decomposition eventually through biological or any other natural activity.

Nonlimiting examples of other optional ingredients that may be included in the film or laminate described herein include aromatic/aliphatic polyester copolymers made more readily hydrolytically cleavable, and hence more likely biodegradable, such as those described in U.S. Pat. Nos. 5,053,482, 5,097,004, 5,097,005, and 5,295,985, biodegradable aliphatic polyesteramide polymers, polycaprolactones, polyesters or polyurethanes derived from aliphatic polyols (i.e., dialkanoyl polymers), polyamides including polyethylene/vinyl alcohol copolymers, cellulose esters or plasticized derivatives thereof, salts, slip agents, crystallization accelerators such as nucleating agents, crystallization retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, antiblocking agents, antistatic agents, or mixtures thereof. Slip agents may be used to help reduce the tackiness or coefficient of friction in the film. Also, slip agents may be used to improve film stability, particularly in high humidity or temperatures.

As defined herein, "film" means an extremely thin continuous piece of a substance having a high length to thickness ratio and a high width to thickness ratio. Such a film or laminate is described in U.S. Pat. No. 5,498,692, incorporated herein in its entirety by reference, which uses blended or laminated compositions as described herein. As defined herein, "blend" means a composition having two or more ingredients (i.e. poly (3-hydroxyalkanoate) or PHA with polylactic acid, or PLA or PHA with or without particulate fillers). While there is no requirement for a precise upper limit of thickness, a preferred upper limit would be 0.010", even more preferably about 0.008", more preferably still about 0.005". The protective value of any film depends on its being continuous, i.e., without holes or cracks. Breathable films include dispersed particulate filler, the film having been stretched to produce continuous pores that prevent penetration of liquid and that pass moisture vapor. A breathable film may be one layer of a multilayer film. The film may be a multilayer film, i.e., a laminate or composite. A laminate is defined as two or more films joined together. A laminate may have one or more layers comprising a blended PHA/PLA composition as set forth herein. In another embodiment, a laminate may have a first layer comprising a PHA copolymer as described herein and a second layer comprising a PLA polymer or copolymer as set forth herein. The laminate may have a first layer comprising a PHA copolymer, a second layer comprising a PHA/PLA blend, and a third layer comprising PLA, or any combination of layers desired. As used, the terms first, second, or third layers are simply used to describe separate layers and are not intended to be limiting as to the location of the layer.

Referring now to the figures, FIG. 1 illustrates a package in cross-section, generally designated 10 in accordance with the present invention. In at least one embodiment, the package 10 includes a high barrier film, generally designated 12.

Figure 2:
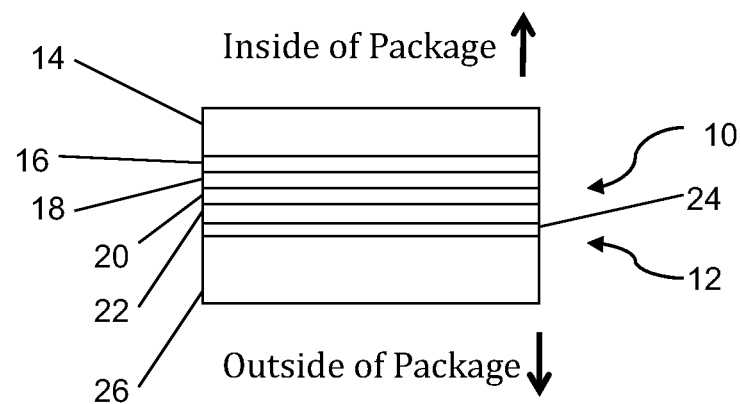
FIG. 2 is an enlarged view of cross-section A-A of the package and high barrier film of FIG. 1.

FIG. 2 illustrates an enlarged view of cross-section A-A of the package 10 and high barrier film 12 of FIG. 1. As illustrated, the film 12 includes a first or product side biopolymer layer 14, a metallization layer 20, and a barrier enhancement layer disposed between the metallization layer 20 and the first or product side biopolymer layer 14, where, in at least one embodiment, the biopolymer film may be made on blown, cast or biaxial orientation such as double bubble or tenter frames.

The barrier enhancement layer promotes or enhances the barrier properties of the film 12, thereby preventing diffusion. In at least one embodiment, metallization layer 20 may be applied to, deposited on or contacts one or more of the film 12, biopolymer layer 14 and/or barrier enhancement layer by passing the film 12, layer 14, or barrier enhancement layer through a vacuum metallizer. A very thin layer (between approximately 150-250 A) of metal (Aluminum for example) may be applied to, deposited on or contacts one or more of the film 12, layer 14 or barrier enhancement layer, forming the metallization layer may have an optical density greater than about 2.0 for example as described in the associated AIM-CAL TP-101-78 Test. In at least one embodiment, a bonding layer may be applied to, deposited on or contacts one of the film layers, where the bonding layer is a coating that is applied by a gravure coater or a flexographic press.

FIG. 2 further illustrates the barrier enhancement layer and may include a primer layer 16 applied to, deposited on or contacting the biopolymer layer 14. The primer layer 16 as defined herein includes a urethane based primer, an acrylic based primer, a polyethylenimine primer, a water based primer, a water based primer having resin dispersions, combinations thereof, and the like. An exemplary embodiment of the primer may include Mica's MICA A-131-X primer.

In at least one embodiment, the barrier enhancement layer further includes a nanocomposite barrier coating 18 applied to, deposited on or contacting one or more of the primer layer 16 and the metallization layer 20. The nanocomposite barrier coating may be a PVOH based coating with nanoclay platelets, a PVOH based coating with other solids, a water based coating with nanoclay platelets or a water based coating with other solids, combinations thereof and the like, such that a tortuous path is created for gas molecules. More specifically, exemplary embodiments of the nanocomposite barrier coating as defined herein may include Nanopack's Nanoseal CPM70AL with nanoclay platelets (also referred to as NSC-100), Inmat's Nanolok PT ADV-7, Sun Chemical's "Sun Bar" oxygen barrier coatings or combinations thereof, and the like.

FIG. 2 further illustrates a bonding or adhesive layer 22 and graphic image layer 24. As illustrated, the adhesive layer 22 contacts or adheres to the metallization layer 20, while the graphic image layer 24 contacts or adheres to the adhesive layer 22. The adhesive layer 22 as defined herein includes any layer of adhesive capable of joining the graphic image layer 24 and the metallization layer 20. The adhesive layer 22 may be a flexible adhesive formed of a solvent based, polyurethane material or the like. An exemplary adhesive is the LA1150-52 adhesive available from the Henkel Corporation of Cary, N.C. Additionally, the graphic image layer 24 includes any material having a graphics image applied thereto by known graphics applications, including flexographic, rotogravure, inkjet, and lithographic methods, combinations thereof and the like.

In at least one embodiment, the film 12 further includes a second or outer biopolymer layer 26, where the second or outer biopolymer layer 26 contacts the graphics image layer 24 and may be thermally or otherwise laminated to the film 12 similar to that provided previously. The biopolymer layers 14 and 26 may be formed of any suitable material including polylactic acid, aliphatic-aromatic polyesters, poly (3-hydroxyalkanoate) (PHA), cellulose, cellophane or starch based polymers, some combination thereof, or the like. In one embodiment, the biopolymer layer 14 and 26 are a monolayer or multilayers between about 0.0004 and about 0.006 inches thick (more particularly between about 0.0008 and about 0.003 inches thick). Further, at least one of the biopolymer layers 14 and 26, metallization layer 20 and the barrier enhancement layer act as a barrier against matter selected from the group consisting of moisture, oxygen, carbon dioxide, contaminants and aroma.

Figure 3:
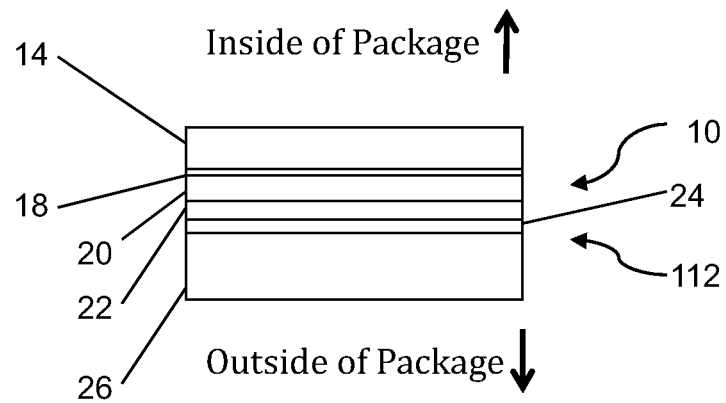
FIG. 3 is another enlarged view of cross-section A-A of the package and high barrier film of FIG. 1.

FIG. 3 illustrates another embodiment of film 112 used in package 10, similar to film 12 of FIG. 2. Film 112 includes a first or product side biopolymer layer 14, a metallization layer 20, and a barrier enhancement layer disposed between the metallization layer 20 and the first or product side biopolymer layer 14, promoting or enhancing the barrier properties of the film 112.

In this embodiment, the barrier enhancement layer includes a nanocomposite barrier coating 18 applied to, deposited on or contacting one or more of the biopolymer layer 14 and the metallization layer 20. The nanocomposite barrier coating 18 as defined herein includes a PVOH based coating with nanoclay platelets, a PVOH based coating with other solids, a water based coating with nanoclay platelets or a water based coating with other solids, combinations thereof and the like.

FIG. 3 further illustrates a bonding or adhesive layer 22 and graphic image layer 24. As illustrated, the adhesive layer 22 contacts or adheres to the metallization layer 20, while the graphic image layer 24 contacts or adheres to the adhesive layer 22.

In at least one embodiment, the film 112 further includes a second or outer biopolymer layer 26, where the second or outer biopolymer layer 26 contacts the graphics image layer 24 and may be thermally or otherwise laminated to the film 112 similar to that provided previously. The biopolymer layers 14 and 26 may be formed of any suitable material including polylactic acid, aliphatic-aromatic polyesters, poly (3-hydroxyalkanoate) (PHA), cellulose, cellophane or starch based polymers, some combination thereof, or the like.

Figure 4:
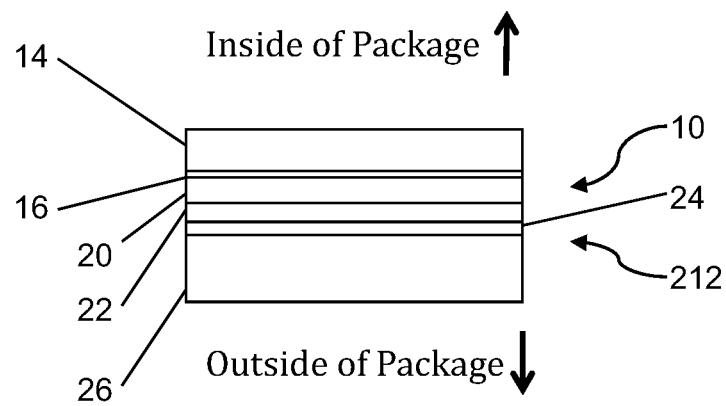
FIG. 4 is still another enlarged view of cross-section A-A of the package and high barrier film of FIG. 1.

FIG. 4 illustrates an enlarged view of cross-section A-A of the package 10 and high barrier film 212, similar to the film 12. As illustrated, the film 212 includes a first or product side biopolymer layer 14, a metallization layer 20, and a barrier enhancement layer disposed between the metallization layer 20 and the first or product side biopolymer layer 14, where, in at least one embodiment, the biopolymer film may be made on blown, cast or biaxial orientation such as double bubble or tenter frames. The barrier enhancement layer promotes or enhances the barrier properties of the film 212. In at least one embodiment, metallization layer 20 may be applied to, deposited on or contacts one or more of the film 212, biopolymer layer 14 and/or barrier enhancement layer by passing the film 212, layer 14, or barrier enhancement layer through a vacuum metallizer. A very thin layer (approximately 150-250 A) of metal (Aluminum for example) may be applied to, deposited on or contacts one or more of the film 212, layer 14 or barrier enhancement layer, forming the metallization layer. In at least one embodiment, a bonding layer may be applied to, deposited on or contacts one of the film layers, where the bonding layer is a coating that is applied by a gravure coater or a flexographic press.

FIG. 4 further illustrates the barrier enhancement layer includes a primer layer 16 applied to, deposited on or contacting the biopolymer layer 14. The primer layer 16 as defined herein includes a urethane based primer, an acrylic based primer, combinations thereof, and the like.

FIG. 4 further illustrates a bonding or adhesive layer 22 and graphic image layer 24. As illustrated, the adhesive layer 22 contacts or adheres to the metallization layer 20, while the graphic image layer 24 contacts or adheres to the adhesive layer 22. The adhesive layer 22 as defined herein includes any layer of adhesive capable of joining the graphic image layer 24 and the metallization layer 20.

In at least one embodiment, the film 212 further includes a second or outer biopolymer layer 26, where the second or outer biopolymer layer 26 contacts the graphics image layer 24 and may be thermally or otherwise laminated to the film 12 similar to that provided previously. The biopolymer layers 14 and 26 may be formed of any suitable material including polylactic acid, aliphatic-aromatic polyesters, poly (3-hydroxyalkanoate) (PHA), cellulose, cellophane or starch based polymers, some combination thereof, or the like.

Figure 5:
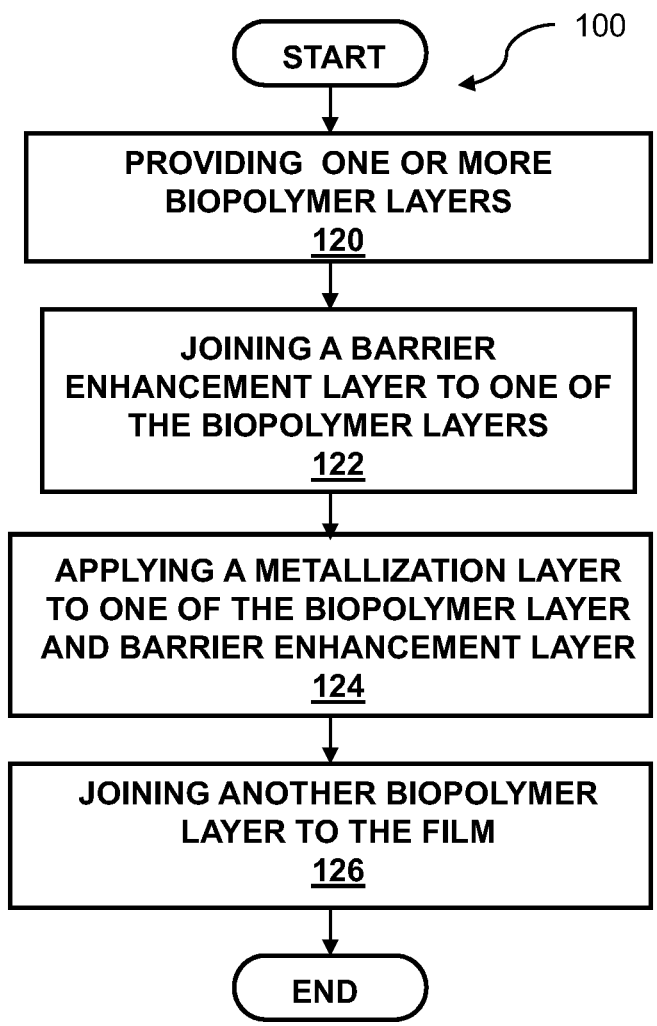
FIG. 5 is a flowchart illustrating a method for forming a high barrier film in accordance with the present invention.

FIG. 5 illustrates a flowchart of a method, generally designated 100, for forming a high barrier film or a packaging including a high barrier film in accordance with the present invention. As illustrated, the method 100 comprises forming or providing one or more biopolymer layers, block 120, and a barrier enhancement layer applied to, deposited on or otherwise contacts the one or more of the biopolymer layers, block 122.

Method 100 further includes applying, depositing or otherwise contacting a metallization layer to one or more of the biopolymer layers, primer layer and/or metallization layer, block 124. FIG. 5 further illustrates another biopolymer layer joined to the metallization layer, block 126. In this embodiment, this biopolymer layer may be thermally or otherwise laminated to one or more of the biopolymer layer, the metallization layer, the primer layer and/or the nanocomposite barrier coating.

Figure 6:
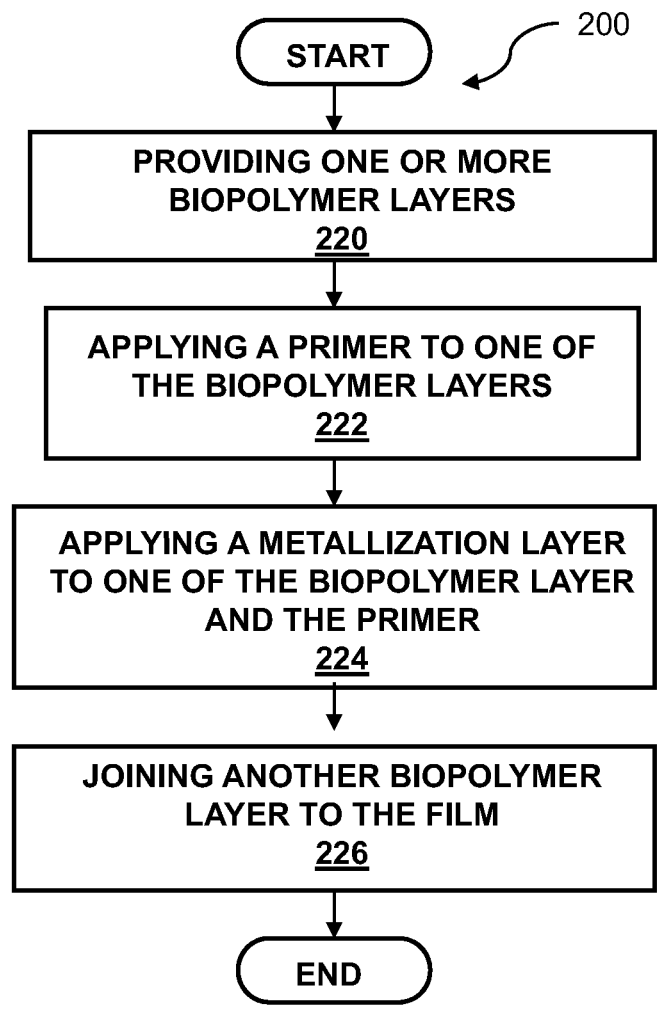
FIG. 6 is a flowchart illustrating another method for forming a high barrier film in accordance with the present invention.

FIG. 6 illustrates a flowchart of a method, generally designated 200, for forming a high barrier film or a packaging including a high barrier film in accordance with the present invention. As illustrated, the method 200 comprises forming or providing one or more biopolymer layers, block 220, and a barrier enhancement layer may be applied to, deposited on or otherwise contacts the one or more of the biopolymer layers. In this embodiment, a primer layer may be applied to, deposited on or otherwise contacts one or more of the biopolymer layers, block 222, and a nanocomposite barrier coating may be applied to, deposited on or otherwise contacts one or more of the biopolymer layers and/or primer layer, block 224.

Method 200 further includes applying, depositing or otherwise contacting a metallization layer to one or more of the biopolymer layers, primer layer and/or metallization layer, block 226. FIG. 6 further illustrates another biopolymer layer joined to the metallization layer, block 228. In this embodiment, this biopolymer layer may be thermally or otherwise laminated to one or more of the biopolymer layer, the metallization layer, the primer layer and/or the nanocomposite barrier coating.

Figure 7:
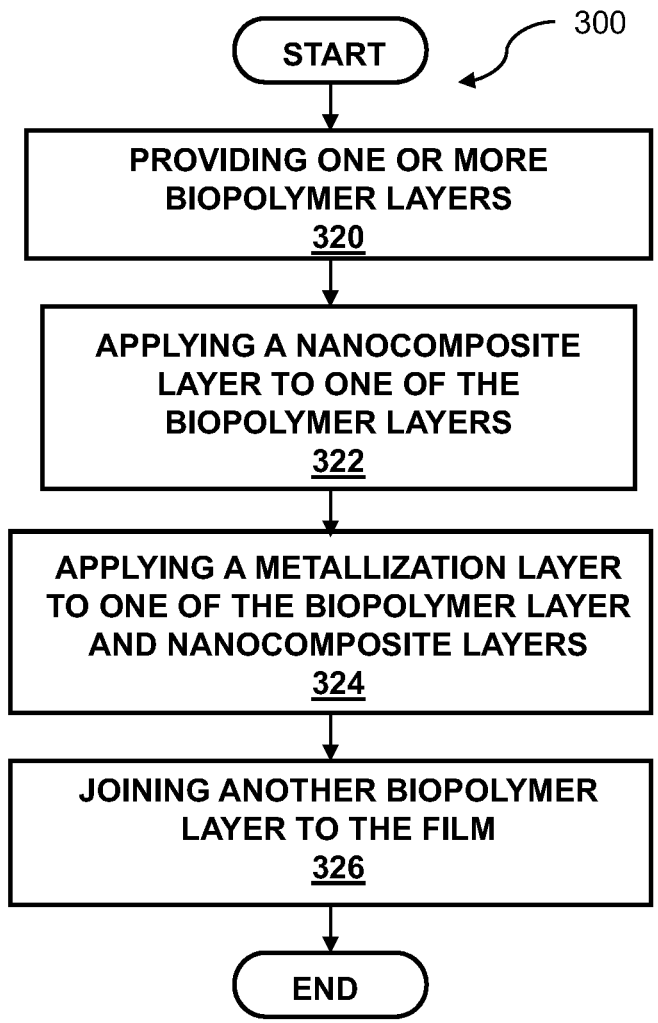
FIG. 7 is a flowchart illustrating still another method for forming a high barrier film in accordance with the present invention.

FIG. 7 illustrates a flowchart of a method, generally designated 300, for forming a high barrier film or a packaging including a high barrier film in accordance with the present invention. As illustrated, the method 300 comprises forming or providing one or more biopolymer layers, block 320, and a barrier enhancement layer may be applied to, deposited on or otherwise contacts the one or more of the biopolymer layers. In this embodiment, a primer layer may be applied to, deposited on or otherwise contacts one or more of the biopolymer layers, block 322, and a nanocomposite barrier coating may be applied to, deposited on or otherwise contacts one or more of the biopolymer layers and/or primer layer, block 324.

Method 300 further includes applying, depositing or otherwise contacting a metallization layer to one or more of the biopolymer layers, primer layer and/or metallization layer, block 326. FIG. 7 further illustrates another biopolymer layer joined to the metallization layer, block 328. In this embodiment, this biopolymer layer may be thermally or otherwise laminated to one or more of the biopolymer layer, the metallization layer, the primer layer and/or the nanocomposite barrier coating.

Figure 8:
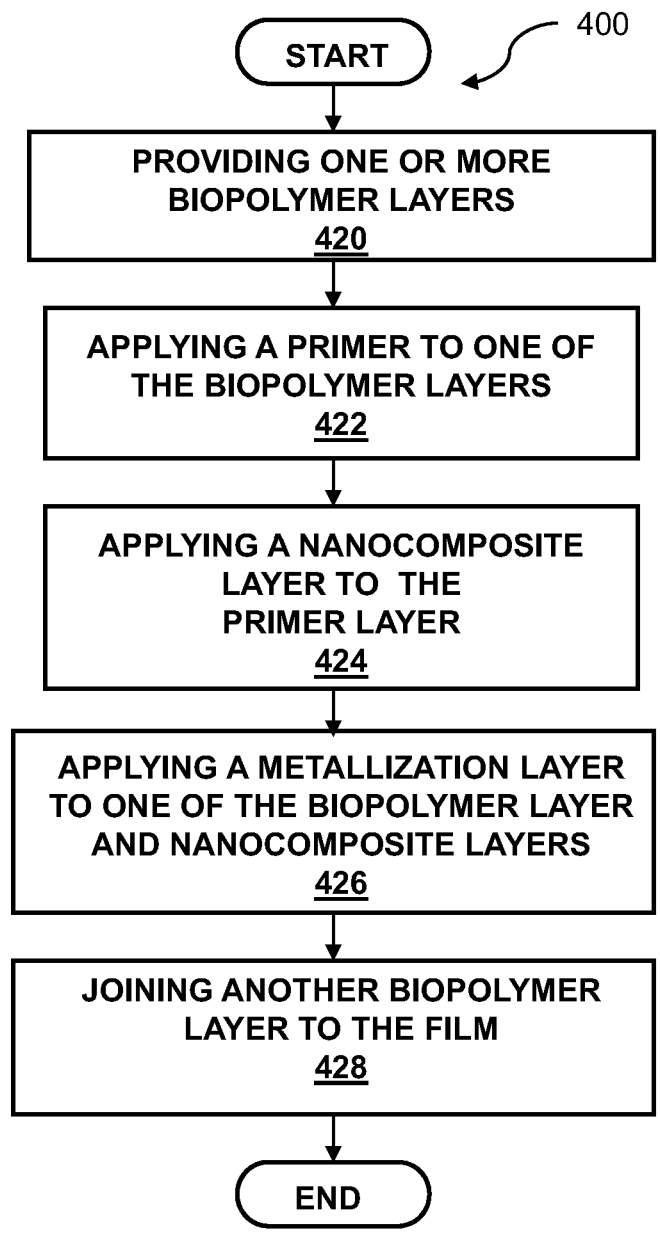
FIG. 8 is a yet another flowchart of a method for forming a packaging and high barrier film in accordance with the present invention.

FIG. 8 illustrates a flowchart of a method, generally designated 400, for forming a high barrier film or a package including a high barrier film in accordance with the present invention. As illustrated, the method 400 comprises forming or providing one or more biopolymer layers, block 420, and a barrier enhancement layer may be applied to, deposited on or otherwise contacts the one or more of the biopolymer layers. In this embodiment, a primer layer may be applied to, deposited on or otherwise contacts one or more of the biopolymer layers, block 422, and a nanocomposite barrier coating may be applied to, deposited on or otherwise contacts one or more of the biopolymer layers and/or primer layer, block 424.

Method 400 further includes applying, depositing or otherwise contacting a metallization layer to one or more of the biopolymer layers, primer layer and/or metallization layer, block 426. FIG. 8 further illustrates another biopolymer layers joined to the metallization layer, block 428. In this embodiment, the biopolymer layer may be thermally or otherwise laminated to one or more of the biopolymer layer, the metallization layer, the primer layer and/or the nanocomposite barrier coating.

In one or more of the methods illustrated in FIGS. 5-8 include the primer layer is made of a material selected from the group consisting of urethane based primer, an acrylic based primer, a polyethylenimine primer, a water based primer, a water based primer having resin dispersions, combinations thereof, and the like; while the nanocomposite barrier coating is a material selected from the group consisting of a PVOH based coating with nanoclay platelets, a PVOH based coating with other solids, a water based coating with nanoclay platelets or a water based coating with other solids, combinations thereof and the like. At least one of the first or product side biopolymer layer and the second or product side biopolymer layer comprises selecting a material from the group consisting of polylactic acid (PLA), aliphatic-aromatic polyesters, poly (3-hydroxyalkanoate) (PHA), cellulose, and starch based polymers, where at least one or both of the biopolymer layers is between about 0.0008 and about 0.003 inches thick. The methods may include applying or contacting an adhesive layer to at least the second or product side biopolymer layer and contacting a graphic image layer to at least one of the adhesive layer and the second or product side biopolymer layer.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A high barrier film comprising:
   a first biopolymer layer;
   a metallization layer having an optical density greater than about 2.0;
   a primer layer affixed to one of the metallization layer and the first biopolymer layer, the primer layer is a urethane based primer, polyethylenimine primer, or a water based primer having resin dispersions;
   a nanocomposite barrier coating disposed between the primer layer and the metallization layer; and
   a second biopolymer layer and an adhesive layer, the adhesive layer disposed between the second biopolymer layer and the metallization layer, wherein the second biopolymer layer is adhered to at least one of the biopolymer layer, the metallization layer, the primer layer and the nanocomposite barrier coating.

2. The high barrier film of claim 1 wherein the nanocomposite barrier coating is a material selected from the group including a PVOH based coating with nanoclay platelets, a PVOH based coating with other solids, a water based coating with nanoclay platelets or a water based coating with other solids.

3. The high barrier film of claim 1 wherein at least one of the first biopolymer layer and the second biopolymer layer is a polylactic acid (PLA), aliphatic-aromatic polyesters, poly (3-hydroxyalkanoate) (PHA), cellulose or starch based polymers.

4. The high barrier film of claim 1 wherein at least one of the biopolymer layer and the second biopolymer layer is between about 0.0004 and about 0.006 inches thick.

5. The high barrier film of claim 1 wherein at least one of the first biopolymer layer, the second biopolymer layer, the metallization layer, the primer layer and the nanocomposite barrier coating acts as a barrier against matter selected from the group including moisture, oxygen, carbon dioxide, contaminants or aroma.

6. A package including a high barrier film comprising:
a product side biopolymer layer;
a primer layer applied to the product side biopolymer layer, the primer layer is a urethane based primer, a polyethylenimine primer, or a water based primer having resin dispersions;
a metallization layer;
a barrier enhancement layer disposed between the metallization layer and the product side biopolymer layer; and
an outer biopolymer layer, the outer biopolymer layer laminated to at least one of the product side biopolymer layer, the metallization layer and the barrier enhancement layer.

7. The package of claim 6 wherein the barrier enhancement layer further comprises a nanocomposite barrier coating contacting the metallization layer.

8. The package of claim 6 wherein the metallization layer has an optical density greater than about 2.0.

9. The package of claim 6 further comprising an adhesive layer disposed between the outer biopolymer layer and the metallization layer.

10. The package of claim 6 wherein at least one of the product side biopolymer layer and the outer biopolymer layer is a material selected from the group consisting of polylactide acid (PLA), aliphatic-aromatic polyesters, poly (3-hydroxyalkanoate) (PHA), cellulose, and starch based polymers.

11. The package of claim 6 wherein at least one of the product side biopolymer layer, the metallization layer, the barrier enhancement layer, and the outer biopolymer layer prevents diffusion of matter selected from the group including moisture, oxygen, carbon dioxide, contaminants or aroma.

12. The package of claim 6 wherein at least one of the product side biopolymer layer and the outer biopolymer layer is between about 0.0004 and about 0.006 inches thick.

13. A method of forming a high barrier film comprising:
providing a first biopolymer layer;
applying a primer layer to the first biopolymer layer, the primer layer is made of a urethane based primer, a polyethylenimine primer, or a water based primer having resin dispersions;
applying a nanocomposite barrier coating to at least one of the first biopolymer layer and the primer layer; applying a metallization layer to at least one of the first biopolymer layer, the primer layer and the nanocomposite barrier coating; and
laminating a second biopolymer layer to at least one of the first biopolymer layer, the primer layer, the nanocomposite barrier coating and the metallization layer.

14. The method of claim 13 wherein the nanocomposite barrier coating is a material selected from the group including a PVOH based coating with nanoclay platelets, a PVOH based coating with other solids, or a water based coating with nanoclay platelets or a water based coating with other solids.

15. The method of claim 13 further comprising an adhesive layer contacting the second biopolymer layer and the metallization layer.

16. The method of claim 13 wherein at least one of the first biopolymer layer and second biopolymer layer is a material selected from the group including polylactic acid (PLA), aliphatic-aromatic polyesters, poly (3-hydroxyalkanoate) (PHA), cellulose, or starch based polymers.

17. The package of claim 13 wherein the metallization layer has an optical density greater than about 2.0.

18. The method of claim 13 wherein at least one of the first biopolymer layer and the second biopolymer layer is between about 0.0004 and about 0.006 inches thick.

* * * * *